US010987663B2

United States Patent
Diaz Jalaff et al.

(10) Patent No.: US 10,987,663 B2
(45) Date of Patent: Apr. 27, 2021

(54) METHOD FOR PREPARING LAMINAR ZINC HYDROXIDE ORGANIC-INORGANIC NANOCOMPOSITES FOR USE IN THE REMOVAL AND DEGRADATION OF DYES FROM TEXTILE EFFLUENTS

(71) Applicant: UNIVERSIDAD DE CHILE, Santiago (CL)

(72) Inventors: Leslie Gabriela Diaz Jalaff, Santiago (CL); Guillermo Antonio Alberto Gonzalez Moraga, Santiago (CL); Eglantina Javiera Benavente Espinosa, Santiago (CL); Harold Ivan Lozano Zarto, Santiago (CL); Sindy Milagros Devis Ruiz, Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 11 days.

(21) Appl. No.: 16/223,779

(22) Filed: Dec. 18, 2018

(65) Prior Publication Data
US 2019/0193061 A1 Jun. 27, 2019

Related U.S. Application Data

(60) Provisional application No. 62/609,770, filed on Dec. 22, 2017.

(51) Int. Cl.
*B01J 31/04* (2006.01)
*B01J 35/02* (2006.01)
(Continued)

(52) U.S. Cl.
CPC .............. *B01J 31/04* (2013.01); *B01J 23/06* (2013.01); *B01J 35/002* (2013.01); *B01J 35/004* (2013.01); *B01J 35/0013* (2013.01); *B01J 35/02* (2013.01); *B01J 37/009* (2013.01); *B01J 37/0236* (2013.01); *B01J 37/038* (2013.01);
(Continued)

(58) Field of Classification Search
None
See application file for complete search history.

(56) References Cited

U.S. PATENT DOCUMENTS

| 2005/0228106 A1* | 10/2005 | Schaefer ................ B82Y 30/00 524/492 |
| 2013/0109357 A1 | 5/2013 | Ganatra et al. |
| 2015/0315048 A1 | 11/2015 | Blanco Tirado et al. |

FOREIGN PATENT DOCUMENTS

| WO | 2004089525 A2 | 10/2004 |
| WO | WO-2017115330 * | 6/2017 ............ B22F 1/0018 |

OTHER PUBLICATIONS

Lopez Cabana, Z et al. Molecular Crystals and Liquid Crystals, 12 (2012), vol. 554 (1).*
(Continued)

*Primary Examiner* — Clinton A Brooks
(74) *Attorney, Agent, or Firm* — Lucas & Mercanti, LLP

(57) ABSTRACT

The present invention relates to a method for removing dyes from textile effluents and other organic substances using nanocomposites based on zinc hydroxides and carboxylic acids capable of adsorbing and degrading. More specifically, the present invention consists of a method to generate new zinc hydroxide-based materials, which allows removal and degradation of methylene blue and other organic compounds from wastewater from industrial effluents, particularly those from textile industry.

11 Claims, 8 Drawing Sheets

(51) Int. Cl.
    *B01J 37/04*         (2006.01)
    *B01J 37/03*         (2006.01)
    *B01J 37/06*         (2006.01)
    *B01J 37/02*         (2006.01)
    *B01J 37/00*         (2006.01)
    *B01J 37/34*         (2006.01)
    *C02F 1/28*          (2006.01)
    *C02F 1/32*          (2006.01)
    *C02F 1/72*          (2006.01)
    *B01J 35/00*         (2006.01)
    *B01J 23/06*         (2006.01)
    *C02F 101/30*        (2006.01)
    *C02F 103/30*        (2006.01)
    *C02F 101/34*        (2006.01)
    *C02F 101/32*        (2006.01)

(52) U.S. Cl.
    CPC ............... *B01J 37/04* (2013.01); *B01J 37/06* (2013.01); *B01J 37/344* (2013.01); *C02F 1/288* (2013.01); *C02F 1/32* (2013.01); *C02F 1/725* (2013.01); *B01J 35/026* (2013.01); *B01J 2231/005* (2013.01); *B01J 2531/004* (2013.01); *C02F 1/281* (2013.01); *C02F 1/285* (2013.01); *C02F 2101/305* (2013.01); *C02F 2101/306* (2013.01); *C02F 2101/308* (2013.01); *C02F 2101/322* (2013.01); *C02F 2101/345* (2013.01); *C02F 2103/30* (2013.01); *C02F 2305/08* (2013.01); *C02F 2305/10* (2013.01)

(56) References Cited

OTHER PUBLICATIONS

F. Duran, et al; Propiedades fotocataliticas de nanocompositos laminares de ZnO/MoS2; IV Congreso Nacional de Nanotecnologia 2016; CNN150; 1 page.
M. M. El-Moselhy, et al; Methylene blue dye degradation using C-100 polymeric material modified with ZnO nanoparticles; Desalination and Water Treatment; 2016; 13 pages.
F. Duran, et al; Photocatalytic Properties of ZnO/MoS2 Nanocomposites; IV National Nanotechnology Congress 2016; CNN150; English translation with Certification of translation; 3 pages.

* cited by examiner

METHOD FOR PREPARING LAMINAR ZINC HYDROXIDE ORGANIC-INORGANIC NANOCOMPOSITES FOR USE IN THE REMOVAL AND DEGRADATION OF DYES FROM TEXTILE EFFLUENTS

CROSS REFERENCE TO RELATED APPLICATION

This Application claims priority from U.S. Provisional Application No. 62/609,770 filed on Dec. 22, 2017, application which is incorporated herein by reference.

FIELD OF THE INVENTION

The present invention relates to a method for removing dyes from textile effluents and other organic substances using nanocomposites based on zinc hydroxides and carboxylic acids capable of adsorbing and degrading. More specifically, the present invention consists of a method to generate new zinc hydroxide-based materials, which allows removal and degradation of methylene blue and other organic compounds from wastewater from industrial effluents, particularly those from textile industry.

BACKGROUND OF THE INVENTION

Dye removal from industrial effluents, specifically from textile industry, is particularly important because of its effects on public health and decreasing water resources availability. It is estimated that textile production (2017) amount to 100 billion kilograms per year using 9.8 trillion gallons of water and more than 500,000 tons of dyes and pigments (in a 1:20 dye:water ratio) to this end. Although this is an old problem, nowadays we are still looking for more efficient and environmentally friendly solutions.

Nowadays, the environmental problems associated with hazardous waste and toxic water pollutants have attracted a lot of attention. Wastewater derived from the manufacture of textiles, paper and other industrial processes contains non-biodegradable residual dyes. Release of toxic and potential carcinogenic substances, such as aqueous phase dyes, creates serious environmental contamination problems. Various chemical and physical processes have been developed such as coagulation/flocculation, activated carbon adsorption, reverse osmosis and ultrafiltration techniques to eliminate color from textile effluents. However, these techniques do not destroy contaminants, since they only transfer non-biodegradable matter to sludge, resulting in a new type of pollution, which requires additional treatment. Therefore, attention must be focused on techniques that lead to the total removal of dye molecules. There are many approximations reported in literature and in patent documents, for example, application WO2004089525 A2 is related to catalysts for photochemical processes which aims the environmental decontamination, being their characteristic a very superior photocatalytical efficiency when compared with the observed for pure titanium oxides. The composites, object of the invention, are a combination of $TiO_2$ with a photosensitiser dye, capable to mediate photocatalytical processes using the incident radiation in wavelength ranges incapable to promote the excitation of the pure photocatalyst.

Patent application No. US 20130109357 A1 is related to a new magnetic dye-absorbing catalyst, which is the modification of the conventional magnetic photocatalyst. The catalyst consists of a composite particle that has a core-shell structure, with a magnetic particle as a core and a dye adsorbent (which can also exhibit photocatalytic activity) as a shell. Patent application No. US 20150315048 A1 relates to a material consisting of hard fibers on which nanoparticles of metals or metal oxides, preferably period IV transition metal oxides, are deposited using different techniques, said material being used in the degradation and removal of contaminants found in liquid matrices. The invention also relates to a method for in situ synthesis thereof.

State of the art document "IV Congreso Nacional de Nanotecnología 2016, Propiedades Fotocatalíticas de Nanocompositos laminares de $ZnO/MoS_2$, F. Duran, E. Benavente and G. González discloses preliminary results of the behavior of nanocomposites formed by ZnO (carboxylic acid) and $MoS_2$ (exfoliated) lamellar hybrids as photocatalysts in the degradation of the methylene blue dye under visible light. This document does not interfere with the present patent application.

In addition, document entitled "Methylene blue dye degradation using C-100 polymeric material modified with ZnO nanoparticles" has been published in the state of the art. In this work, the ZnO nanoparticles were incorporated inside C-100 as a kind of ion exchange material by impregnation with 8% $Zn(CH_3COO)_2$ solution (2). The modified material after $Zn^{2+}$ loading was then treated with a solution of 5% sodium hydroxide to precipitate zinc hydroxide species on the surface of the C-100 exchanger as well as inside the internal pores of the polymeric matrix. After precipitation of zinc hydroxide, the materials were exposed to roasted vapor for an hour on the intermittent periods of time to form a zinc oxide. The synthesized samples with different ZnO loadings were denoted as Zn-HCIX and characterized using X-ray diffraction, energy-dispersive X-ray spectroscopy, scanning electron microscope, and the tunneling electron microscope. The synthesized materials were applied in the photocatalytic degradation of methylene blue dye in aqueous medium using UV irradiation (wavelength=254 nm) under different experimental conditions. The data obtained indicate that the synthesized materials possess a very good adsorption capacity as well as excellent catalytic activity toward the removal of methylene blue.

However, there are no examples using the materials or procedures described by the present patent application. The most frequent is dye removal from industrial effluents using adsorbent materials from various origins. Photocatalytic mineralization of methylene blue is widely known, this dye is frequently used as a model molecule for organic pollutants. There is a plethora of scientific works in which a variety of different photocatalysts are used, including $TiO_2$ and ZnO. The majority of the reports focus on testing the photocatalytic activity of the materials by kinetic evaluation of the methylene blue discoloration processes and not on the joint effect of adsorption removal and definitive elimination of the contaminant by photocatalysis.

SUMMARY OF THE INVENTION

The present invention uses—innocuous to health, environmentally benign, abundant and low cost—precursors that synergistically generate products having a high dye adsorption capacity and good photocatalytic mineralization using ultraviolet or solar light. The dual property of the nanocomposites, adsorbent/photocatalyst, allows both in situ dye removal from aqueous solutions thereof (adsorption+degradation) and use of ex situ processes wherein contaminant adsorption and photocatalytic destruction thereof is carried out in different facilities and places.

In other words, the cited prior art does not disclose a method for adsorbing/degrading dyes in industrial effluents and/or nanocomposite compounds based on zinc hydroxide and carboxylic acids such as those described by the present patent application, wherein the proposed technology allows to eliminate methylene blue and other dyes present in industrial aqueous waste, mainly in those from textile industry.

This technology can be used for adsorbing/degrading other organic molecules of environmental interest which are chemically active such as drugs, pesticides, fertilizers, antibiotics, volatile organic compounds (VOC), endocrine-disrupting chemicals (EDCs) such as bisphenol A and those new organic contaminants that have not been yet identified, all dispersed and/or dissolved in water and effluent.

The photocatalyst can be reused several times after the absorbed species photodegradation process.

DETAILED DESCRIPTION OF THE INVENTION

Figure 1:
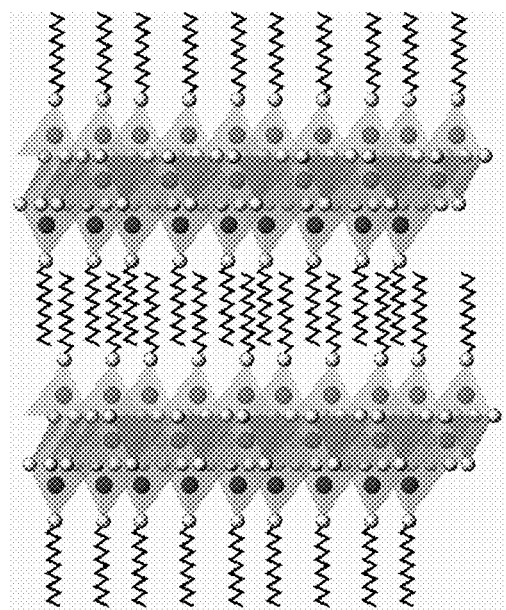
FIG. 1: Shows a structure and organization model of zinc hydroxide organic-inorganic nanocomposites.

The present invention describes a method of preparing laminar zinc hydroxide organic-inorganic nanocomposites comprising several steps.

a) Dissolving in a vessel at least one zinc salt, oxide or hydroxide in distilled water until reaching a molar concentration of 0.1 to 5.0 M, wherein the zinc salt is selected from, but not limited to, zinc chloride ($ZnCl_2$), Zinc cyanide ($Zn(CN)_2$), Zinc sulphate ($ZnSO_4$), zinc nitrate ($Zn(NO_3)_2$), zinc acetate ($Zn(CH_3COO)_2$), zinc carbonate ($ZnCO_3$), zinc acetylacetonate ($C_5H_7ZnO_2$), zinc perchlorate ($Zn(ClO_4)_2$), zinc stearate, salts of zinc ethylenediamine, zinc trifluoroacetylacetonate(II), zinc hexafluoroacetylacetonate, zinc formate(II), zinc(II) methacrylate, zinc neodecanoate, zinc(II) ethylhexanoate, zinc trifluoroacetate(II), and other zinc sources such as zinc oxide (ZnO), zinc hydroxide ($Zn(OH)_2$).

b) Dissolving in a vessel at least one carbonate of alkali metals, alkaline earth metals, other metals and metalloids in distilled water until reaching a molar concentration of 0.1 to 5.0 M, wherein the carbonate is selected from, but not limited to, Li, Na, K, Rb, Cs, Be, Mg, Ca, Sr, Ba, and metals such as Sc, Ti, V, Cr, Mn, Fe, Co, Ni, Cu, Zn, Al, Ga, In, Pb, Bi, Sn, Ge, As, Sb, Ag, Au, Hg, Cd, Mo, Re, W, Nb, Ru, Rh and Zr.

c) Forming a suspension by dropwise adding to a volume of the aqueous solution prepared in step (a), a volume of the aqueous carbonate solution prepared in step (b).

d) The suspension obtained in step c) was heated at 15-120° C. and left under constant stirring ranging from 5 to 10,000 rpm for a homogenization time between 0.1 min and 24 hours.

e) An alkali solution at a molar concentration of 0.1 to 12.0 M is dropwise added to the reaction mixture of step d), until the mixture is adjusted to a pH between 4 and 12.5; wherein the alkali is selected from sodium hydroxide (NaOH), potassium hydroxide (KOH), lithium hydroxide (LiOH), magnesium hydroxide ($Mg(OH)_2$), barium hydroxide ($Ba(OH)_2$), calcium hydroxide ($Ca(OH)_2$) including Arrhenius bases.

f) The suspension obtained in step e) is maintained at a temperature of 15-120° C. under constant stirring ranging from 5 to 10,000 rpm for a homogenization time between 0.1 min and 24 hours.

g) A volume of a molecular or polymeric surfactant solution at a molar concentration of 0.1 to 12.0 M is added, wherein the surfactant is selected from, but not limited to, those with linear, branched or aromatic hydrocarbon chains having 2 or more carbon atoms, having hydrophilic groups such as carboxylic acids and their derivatives, primary and secondary amines, salts of ammonium, amides, thiols, sulfonates, ethers, esters, alcohols, aldehydes, phosphates, and mixtures thereof; in addition the polymeric surfactant is selected from polymers: poly(vinylpyrrolidone) (PVP), polyvinyl alcohol, polycarbonates, polyphenols, polyethylene glycol and polyols such as ethylene glycol, diethylene glycol, triethylene glycol, propylene glycols, alkyldiols as butanediols, dipropylene glycol and polyethylene glycols, chitosan and derivatives thereof, polyacids and derivatives thereof, mercaptoalkanoates, and oxybenzoic acids. Polyacids herein include, but are not limited to, any one or more selected from a group of poly(acrylic acid), poly(maleic acid), poly(methyl methacrylate), poly(acrylic acid-co-methacrylic acid), poly(acrylic acid-co-maleic acid), and poly(acrylamide-co-acrylic acid), cellulose acetates, polyvinyl acetates, polysulfone, polyphenyl sulfones, polyether sulfones, polyketones, polyether ketones, polyesters, polyacetates, polymers and copolymers of two or more of these and the derivatives including, without limitations, any or more of those selected from a group of ammonium, sodium or potassium poly acid salts.

h) The resulting suspension in step g) is maintained at a temperature of 15-120° C. under constant stirring ranging from 5 to 10,000 rpm for a homogenization time between 0.1 min and 24 hours.

i) The resulting suspensions in step h) is maintained at a temperature of 15-120° C. for a time between 0.1 min and 72 hours.

j) The solids obtained in step i) are separated by decantation, filtration, evaporation or centrifugation from 5 to 100,000 rpm for a centrifugation time between 0.1 min and 24 hours, and the precipitate is washed from 1 to 20 times with water and/or a solvent such as, but not limited to, acetone or alcohol, ether, or a mixture thereof.

k) Drying the products obtained from step (j) in an oven at a temperature of 10° C.-200° C., preferably at 60° C. for 48 hours or under vacuum with a pressure between 0.0001 bar and 10.0 bar, or with IR lamp.

The method of the present invention produces nanolamellar solids (nanocomposites) with a stacked layer structure which includes inorganic sheets and other hydrophobic parts or zones (see FIG. 1). These nanocomposites have the ability to adsorb/degrade organic substances that can be dissolved and/or dispersed into water with the help of a light energy source. The hydrophobic interlaminar areas are responsible for contaminant adsorption while the zinc hydroxide inorganic nanolamines are responsible for the degradation with the help of light energy.

Removal of dyes or organic substances involves 2 independent processes that run sequentially:

(i) Adsorption of dye or organic substances in the nanocomposite, in an aqueous medium.

(ii) Degradation of dye or organic substances adsorbed by heterogeneous photocatalysis.

Degradation or removal of the dye or organic substances occurs with step (ii) by light excitation, whereby the product can be reused. In other words, the nanocomposite can be recovered and reused several times.

The light energy source can be natural, such as the sun, or artificial with a power between 0.1 to 200 W such as, but not limited to, lamps LEDs, OLEDs, xenon-mercury, xenon, mercury halides, noble gases, or mixture thereof. This will excite the material generating the degradation of the adsorbed dye and the dye remaining in the solution. This process is attributed to the production of highly active radical species on the surface of the solid (photocatalyst) used.

Figure 7:
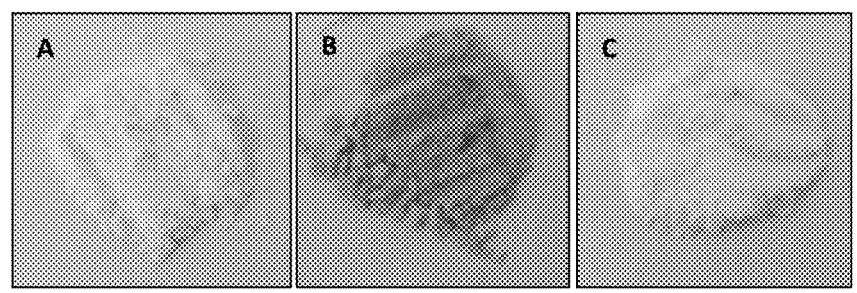
FIG. 7: Images of a laminar zinc hydroxide nanocomposite obtained using stearic acid; (A) No dye addition, (B) After the dark stirring process and (C) sample recovered after UV light irradiation for 300 minutes.

The original laminar zinc hydroxide organic-inorganic nanocomposite is white; the dye adsorption is then easily detectable by the color change solid in the solid after the adsorption process while the solid recovered after the photocatalytic degradation in the presence of light is white (see sequence in FIG. 7). Image 7B shows the presence of dye in the solid by a color change, color which disappears completely after irradiation.

Given the independence of i) absorption and ii) degradation processes, these can occur in situ or in different places, which opens the possibility of first extracting the pollutants in the effluents and removing them through photocatalysis in different sites.

Photocatalyst can be reused several times after the absorbed species photodegradation process.

EXAMPLES

Example 1

Example of Obtaining Zinc Hydroxide-Myristic Acid Nanocomposite and Degradation of Methylene Blue To 10.0 mL of an aqueous solution of 1.0 M zinc sulfate ($ZnSO_4$) was dropwise added 5.0 mL of a 1.0 M sodium carbonate ($Na_2CO_3$) aqueous solution. A white suspension was immediately formed after addition. This was left under constant stirring at 600 rpm for 10 minutes at 55° C. Then, 10.0 mL of a 1.0 M sodium hydroxide (NaOH) aqueous solution was dropwise added until obtaining a suspension with pH equal to 9. The latter was left under constant stirring at 600 rpm for 10 minutes at the same temperature. In the final step, 5.0 mL of a previously prepared 0.4 M myristic acid solution was added using a 1:1 v/v water:acetone mixture as solvent, in a water bath. The resulting suspensions were left under constant stirring at 600 rpm for 48 h at 55° C. After that, suspensions were left standing for 24 h at room temperature. The obtained solids were separated by centrifugation at 6,000 rpm and washed 3 times with a 1:1 water:acetone solution. Finally, the products were dried in an oven at 60° C. for 48 h and grinded in an agate mortar. This process produced lamellar solids with a stacked layer structure (FIG. 1).

Figure 2:
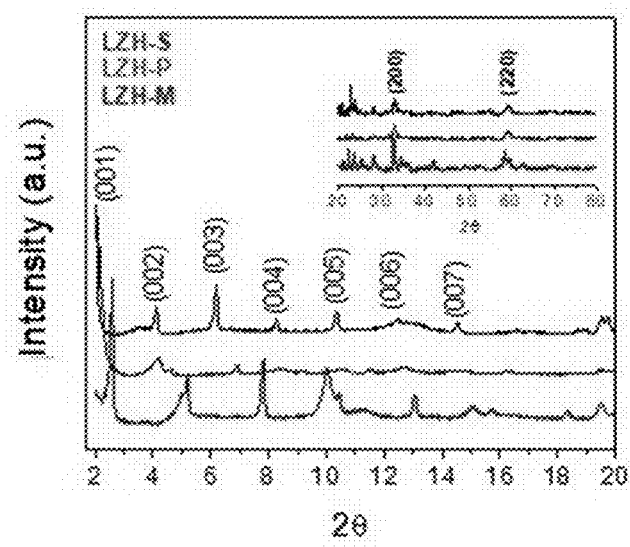
FIG. 2: Shows X-ray diffraction patterns of zinc hydroxide nanocomposites with myristic (LZH-M), palmitic (LZH-P) and stearic (LZH-S) carboxylic acids. The box shows the area at a wider angle.
Figure 3:
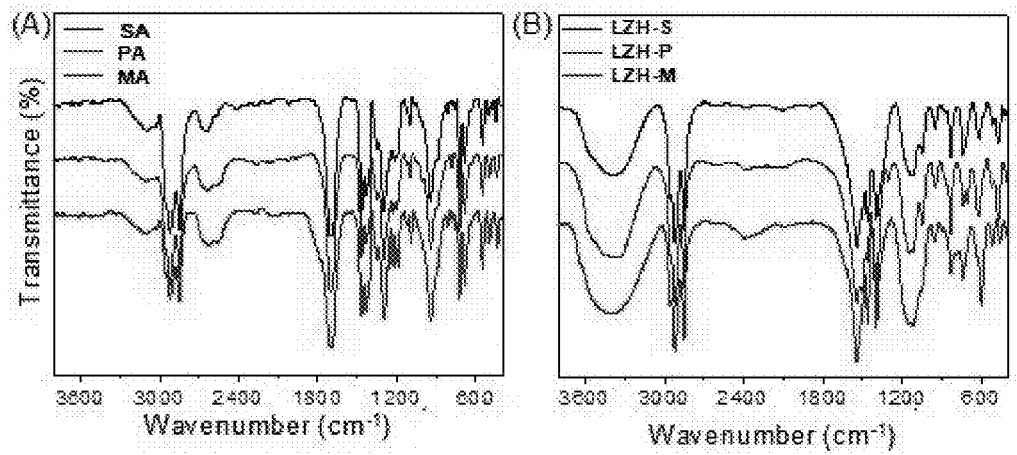
FIG. 3: FTIR spectra of (A) myristic (MA) palmitic (PA) and stearic (SA) carboxylic acids and (B) zinc hydroxide nanocomposites made with 3 long chain carboxylic acids, LZH-M, LZH-P and LZH-S.
Figure 4:
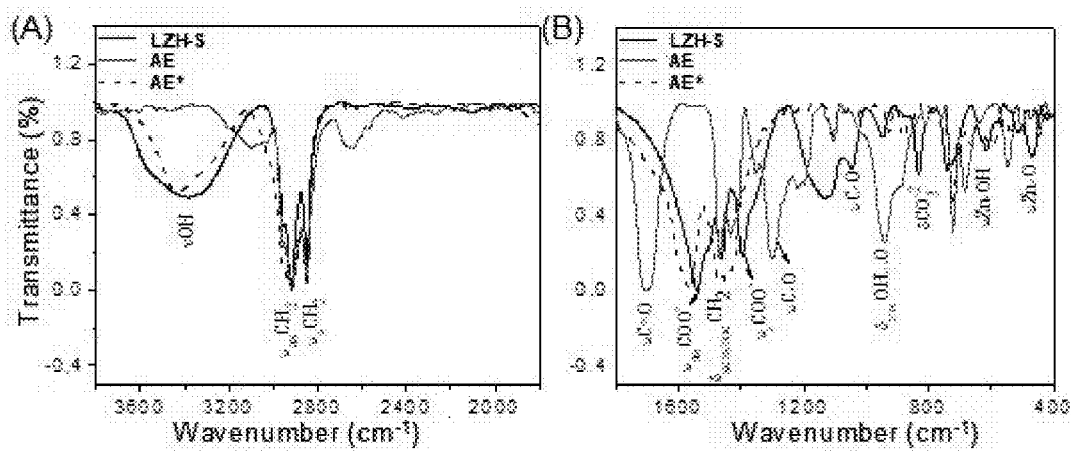
FIG. 4: Comparison of the FTIR spectra for the zinc hydroxide and stearic acid (LZH-S) nanocomposite and commercial surfactant (AE) and that exposed to the same synthesis conditions of the composites (AE*).
Figure 5:
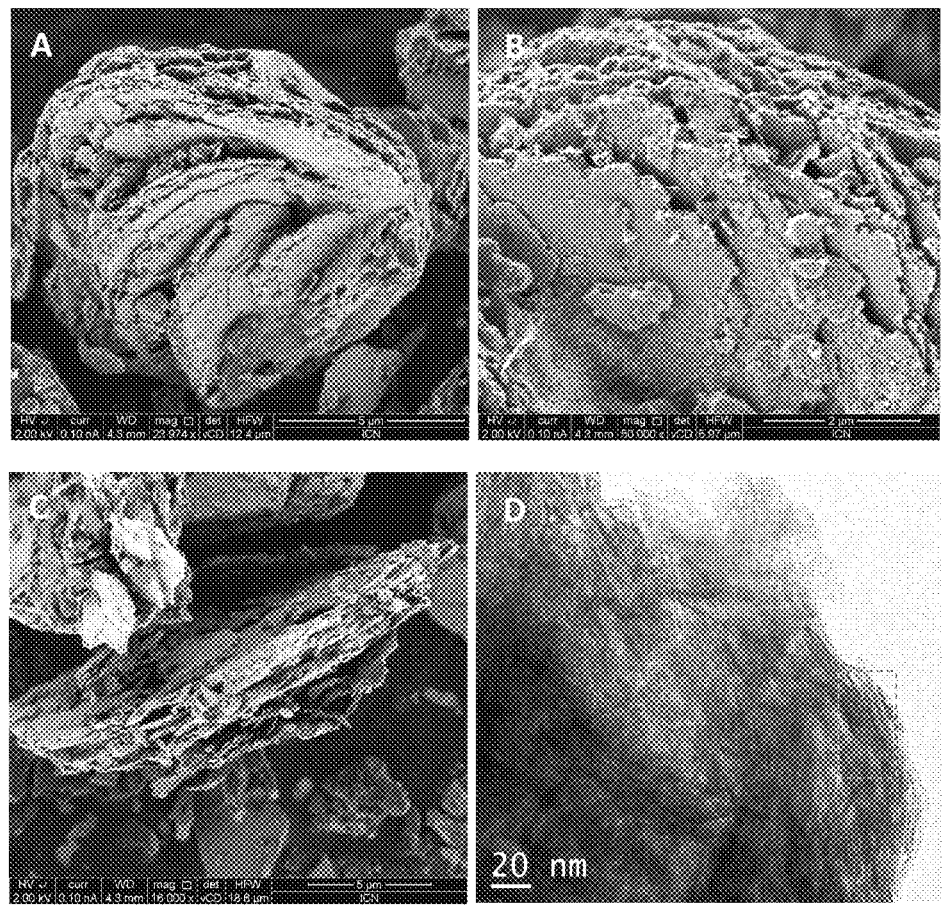
FIG. 5: High resolution SEM (A-C) and (D) TEM images obtained for the zinc hydroxide and myristic acid nanocomposite ($C_{14}H_{28}O_2$).

Nanocomposites obtained have a novel structure of stacked sheets formed by inorganic layers of zinc hydroxides intercalated with carboxylate anions, as illustrated in the scheme of FIG. 1. Product lamellar structure was determined by X-ray diffraction (FIG. 2). Product interlaminar distances are shown in Table 1. The presence of intercalated carboxylate anions was confirmed by FT-IR spectroscopy (FIGS. 3 and 4). Product lamellar morphology can be clearly seen in the scanning and transmission electron microscopy micrographs (FIG. 5).

Figure 6:
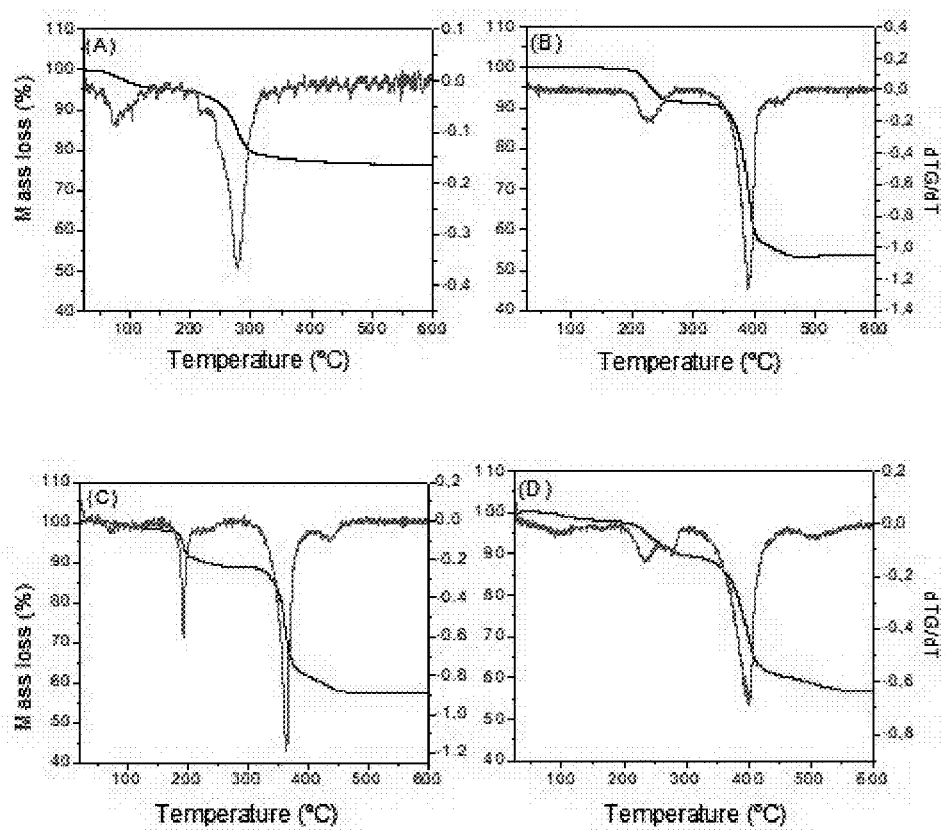
FIG. 6: Thermogravimetric curves and their derivatives for zinc hydroxides (A) without addition of surfactants and in nanocomposites with (B) stearic acid, (C) palmitic acid and (D) myristic acid, respectively.

Nature and composition of the solids was investigated by thermal analysis (FIG. 6). This product allows the adsorption of the dye in the solid, favored by the presence of the organic component, as well as the degradation thereof by ultraviolet or solar light excitation (photocatalysis) of the inorganic phase. Thus, these products have an adsorbent and photocatalyst dual capacity.

The methodology used for dye degradation is described below.

Figure 8:
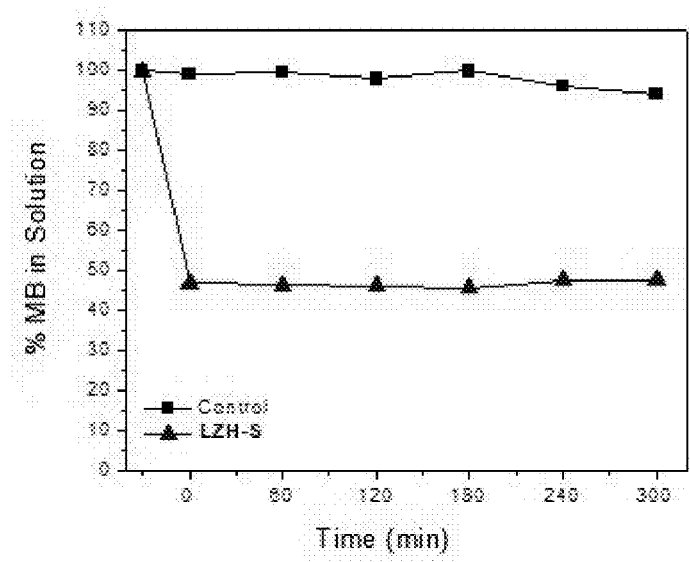
FIG. 8: Removal of methylene blue from an aqueous solution by contacting with a laminar zinc hydroxide, LZH-S in this case, in the absence of light.

90 mg of nanocomposite is dispersed in 1.0 mL of ethanol. This suspension is added to 50 mL of methylene blue aqueous solution with a 0.00001 M concentration and is left under stirring at 600 rpm for 30 minutes. This time is sufficient to obtain a maximum dye adsorption on the solid surface. The absorption removal rate of the dye from the aqueous sample with addition of a laminar zinc hydroxide composite prepared with stearic acid (LZH-S) in the dark, is approximately 50% (FIG. 8). The aforementioned graph shows that dye removal from the solution occurs within the first 30 minutes and then remain constant over time.

Figure 9:
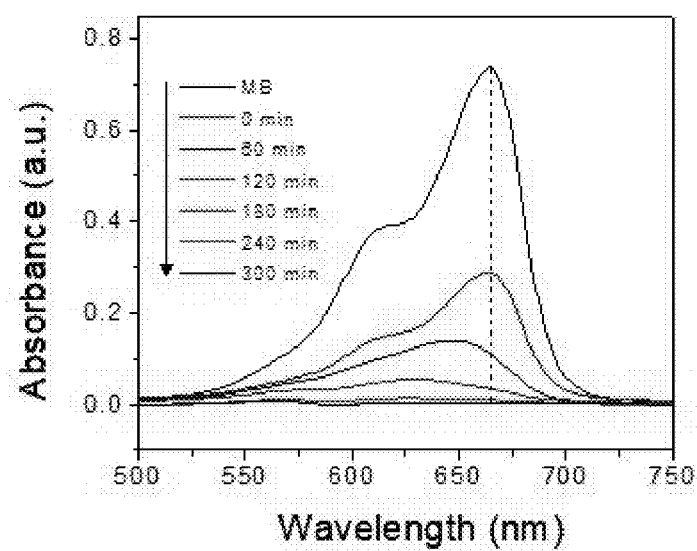
FIG. 9: Evolution of methylene blue (MB) absorption spectra versus irradiation time, using LZH-S as photocatalyst.

Degradation kinetics of Methylene Blue (MB) in solution under light irradiation in the presence of catalyst was monitored by observing Methylene Blue absorption spectrum, and its solution concentration was determined by absorption intensity at 665 nm (FIG. 9). It is observed that the dye in solution is completely degraded at 5-6 hours.

Catalyst can be reused several times after the absorbed species photodegradation process. To that end, three experiments were made using the same nanocomposite sample.

Figure 10:
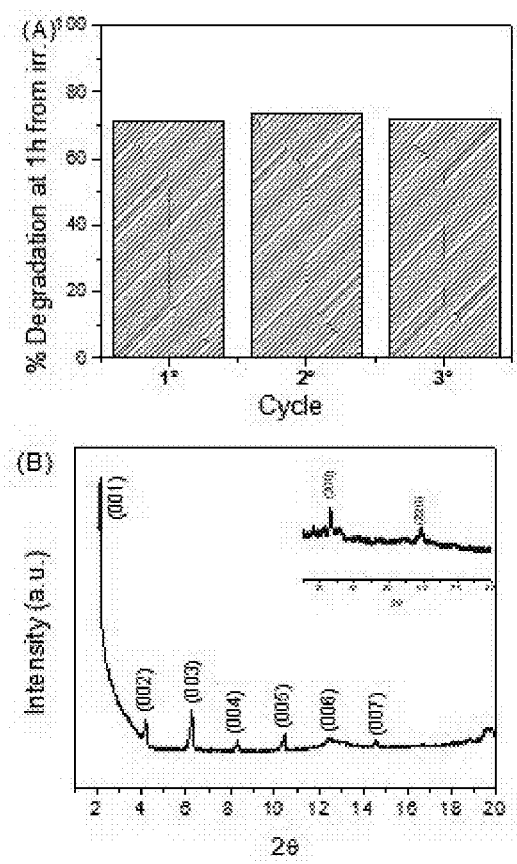
FIG. 10: (A) Cycles of reuse and (B) X-ray diffraction pattern for LZH-S after the photocatalytic process. This remains unchanged.

The capacity of the catalyst after 3 cycles was reduced by 2% compared to the original (FIG. 10).

Example 2

Example of Obtaining Zinc Hydroxide-Stearic Acid Nanocomposite and Methyl Orange Degradation To 10.0 mL of 1.0 M zinc sulfate ($ZnSO_4$) aqueous solution was dropwise added 5.0 mL of a 1.0 M sodium carbonate ($Na_2CO_3$) aqueous solution. A white precipitate immediately formed after addition. The resulting suspension was left under constant stirring at 600 rpm for 10 minutes at 55° C. Then, 10.0 mL of a 1.0 M sodium hydroxide (NaOH) aqueous solution was dropwise added until obtaining a suspension with pH equal to 9. The latter was left under constant stirring at 600 rpm for 10 minutes at the same temperature. In the final step, 5.0 mL of a previously prepared 0.4 M stearic acid solution was added using a 1:1 v/v water:acetone mixture as solvent, in a water bath. The resulting suspensions were left under constant stirring at 600 rpm for 48 h at 55° C. After that, the suspensions were left standing for 24 h at room temperature. The obtained solids were separated by centrifugation at 6,000 rpm and washed 3 times with a 1:1 water:acetone solution. Finally, the products were dried in an oven at 60° C. for 48 h and grinded in an agate mortar. This process produced lamellar solids with a stacked layer structure (FIG. 1).

For methyl orange degradation, 90 mg of nanocomposite is dispersed in 1.0 mL of ethanol. This suspension is added to 50 mL of methyl orange aqueous solution at a 0.00001 M concentration and it is left under stirring at 600 rpm for 360 minutes. This time is sufficient to obtain a maximum dye adsorption on the solid surface. The absorption removal rate of the dye from the aqueous sample with addition of a laminar zinc hydroxide composite prepared with stearic acid (LZH-S) in the dark, is approximately 50%. Dye removal from solution occurs within the first 30 minutes, to then remain constant over time.

Degradation kinetics of Methyl Orange (MO) in solution under light irradiation in the presence of catalyst was monitored by observing Methyl Orange absorption spectrum and its solution concentration was determined by absorption intensity at 665 nm. It is observed that the dye in solution is completely degraded.

Example 3

Example of Obtaining Zinc Hydroxide-Palmitic Acid Nanocomposite and Methylene Blue Degradation To 10.0 mL of an aqueous solution of 1.0 M zinc sulfate ($ZnSO_4$) was dropwise added 5.0 mL of a 1.0 M sodium carbonate ($Na_2CO_3$) aqueous solution. A white precipitate immediately formed after addition. The resulting suspension was left under constant stirring at 600 rpm for 10 minutes at 55° C. Then, 10.0 mL of a 1.0 M sodium hydroxide (NaOH) aqueous solution was dropwise added until obtaining a suspension with pH equal to 9. The latter was left under constant stirring at 600 rpm for 10 minutes at the same temperature. In the final step, 5.0 mL of the previously prepared 0.4 M palmitic acid solution was added using a 1:1 v/v water:acetone mixture as solvent, in a water bath. The resulting suspensions were left under constant stirring at 600 rpm for 48 h at 55° C. After that, the suspensions were left standing for 24 h at room temperature. The obtained solids were separated by centrifugation at 6,000 rpm and washed 3 times with a 1:1 water:acetone solution. Finally, the products were dried in an oven at 60° C. for 48 h and grinded in an agate mortar. This process produced lamellar solids with a stacked layer structure (FIG. 1).

Figure 11:
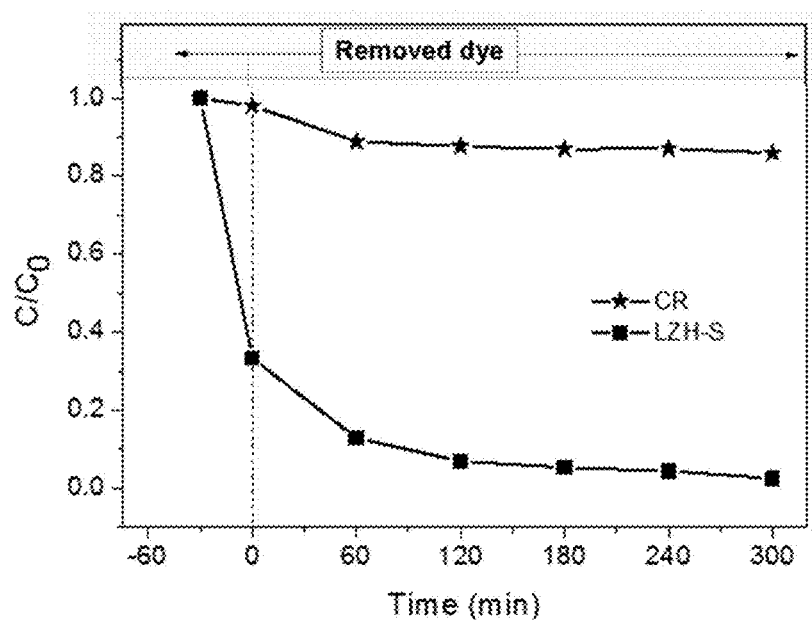
FIG. 11: Removal of Congo Red (CR) from an aqueous solution by contacting with a laminar zinc hydroxide, LZH-S in this case, in the presence of light.

90 mg of zinc hydroxide-palmitic acid nanocomposite and a $1\times10^{-5}$ mol/L methylene blue solution were used. UV-Vis irradiation (immersion lamp) was used. Nanocomposites absorbed in the dark more than 50% and the total degradation was achieved after 300 min of irradiation (FIG. 11).

Example 4

Example of Obtaining Zinc Hydroxide-Aliphatic Carboxylic Acids Nanocomposites Three nanocomposites of zinc hydroxide with carboxylic acids (myristic, palmitic and stearic) were prepared using this technology. Distances were found to be directly dependent on the surfactant being used as shown by the difference in interlaminar distances. Table 1 shows the results of the X-ray diffraction analysis of the 3 nanocomposites used in examples 1, 2 and 3 (FIG. 2).

TABLE 1

| Composite | Molecular surfactant formula | $d_{001}$ (nm) | Total length R—COO— (nm) |
|---|---|---|---|
| LZH-S | $C_{18}H_{36}O_2$ | 4.294 | 2.360 |
| LZH-P | $C_{16}H_{32}O_2$ | 4.264 | 2.110 |
| LZH-M | $C_{14}H_{28}O_2$ | 3.409 | 1.860 |

Example 5

Degradation of Congo Red with Zinc Hydroxide-Myristic Acid Nanocomposite 90 mg of zinc hydroxide-myristic acid nanocomposite and a $3\times10^{-5}$ mol/L Congo Red solution were used. UV-Vis irradiation (immersion lamp) was used. Nanocomposites absorbed in the dark more than 60% and the total degradation was achieved after 300 min of irradiation (FIG. 11). The experimental procedure was carried out following the methodology of examples 1 and 2, but using Congo Red as a test molecule.

The invention claimed is:

1. A method for preparing laminar zinc hydroxide organic-inorganic nanocomposites for use in the removal and degradation of dyes from textile effluents and organic substances, comprising:
    a) dissolving in a vessel at least a zinc salt, oxide or hydroxide in distilled water until reaching a molar concentration of 0.1 to 5.0 M;
    b) dissolving in a vessel at least a carbonate of alkali metals, alkaline-earth metals, other metals and metalloids in distilled water until reaching a molar concentration of 0.1 to 5.0 M;
    c) forming a suspension by dropwise adding to a volume of the aqueous solution prepared in step (a), a volume of the aqueous carbonate solution prepared in step (b);
    d) heating the suspension obtained in step (c), between 15-120° C. under constant stirring ranging from 5 to 10,000 rpm for a homogenization time between 0.1 min and 24 hours;

e) adjusting the reaction mixture of step (d) to a pH between 5 and 9.9 with an alkali solution with a molar concentration of 0.1 to 12.0 M;

f) homogenizing the suspension obtained in step (e) between 0.1 min and 24 hours at a temperature of 15-120° C. under constant stirring ranging between 5 to 10,000 rpm;

g) adding a volume of a molecular surfactant solution with a molar concentration of 0.1 to 12.0 M, where the surfactant comprises compounds having linear, branched or aromatic hydrocarbon chains with 2 or more carbon atoms, with hydrophilic groups;

h) homogenizing the resulting suspension in step (g) between 0.1 min and 24 hours at a temperature of 15-120° C. and under constant stirring ranging from 5 to 10,000 rpm;

i) maintaining the suspension resulting from step (h) at a temperature of 15-120° C. for a time between 0.1 min and 72 hours;

j) separating and washing solids obtained in step (i); and k) drying the products obtained from step (j).

2. The method for preparing laminar zinc hydroxide organic-inorganic nanocomposites according to claim 1, wherein the zinc salt in step (a) is selected from the group consisting of zinc chloride ($ZnCl_2$), zinc cyanide ($Zn(CN)_2$), Zinc sulfate ($ZnSO_4$), zinc nitrate ($Zn(NO_3)_2$), zinc acetate ($Zn(CH_3COO)_2$), zinc carbonate ($ZnCO_3$), zinc acetylacetonate ($C_5H_7ZnO_2$), zinc perchlorate ($Zn(ClO_4)_2$), zinc stearate, salts of zinc(II) ethylenediamine, zinc(II) trifluoroacetylacetonate, zinc hexafluoroacetylacetonate, zinc(II) formate, zinc(II) methacrylate, zinc(II) neodecanoate, zinc(II) ethylhexanoate, zinc(II) trifluoroacetate, zinc oxide (ZnO) and zinc hydroxide ($Zn(OH)_2$).

3. The method for preparing laminar zinc hydroxide organic-inorganic nanocomposites according to claim 1, wherein the carbonate of step (b) is selected from the group consisting of Li, Na, K, Rb, Cs, Be, Mg, Ca, Sr, Ba, Sc, Ti, V, Cr, Mn, Fe, Co, Ni, Cu, Zn, Al, Ga, In, Pb, Bi, Sn, Ge, As, Sb, Ag, Au, Hg, Cd, Mo, Re, W, Nb, Ru, Rh and Zr.

4. The method for preparing laminar zinc hydroxide organic-inorganic nanocomposites according to claim 1, wherein the alkali in step (e) is selected from the group consisting of sodium hydroxide (NaOH), potassium hydroxide (KOH), lithium hydroxide (LiOH), magnesium hydroxide ($Mg(OH)_2$), barium hydroxide ($Ba(OH)_2$), calcium hydroxide ($Ca(OH)_2$) including Arrhenius bases.

5. The method for preparing laminar zinc hydroxide organic-inorganic nanocomposites according to claim 1, wherein the molecular surfactant of step (g) is selected from the group consisting of carboxylic acids and derivatives thereof, primary and secondary amines, salts of ammonium, amides, thiols, sulfonates, ethers, esters, alcohols, aldehydes, phosphates, and mixtures thereof.

6. The method for preparing laminar zinc hydroxide organic-inorganic nanocomposites according to claim 1, wherein the separation of the solids obtained in step (i) is carried out by decantation, filtration, evaporation or centrifugation from 5 to 100,000 rpm for a centrifugation time between 0.1 min and 24 hours, and the precipitate is washed from 1 to 20 times with water and/or a solvent.

7. The method for preparing laminar zinc hydroxide organic-inorganic nanocomposites according to claim 6, wherein the solvent is selected from the group consisting of acetone, alcohol, ether and mixtures thereof.

8. The method for preparing laminar zinc hydroxide organic-inorganic nanocomposites according to claim 1, wherein the products obtained from step (j) are dried in an oven with a temperature of 10-200° C. for 48 hours.

9. The method for preparing laminar zinc hydroxide organic-inorganic nanocomposites according to claim 8, wherein the temperature is 60° C.

10. The method for preparing laminar zinc hydroxide organic-inorganic nanocomposites according to claim 1, wherein the products obtained from step (j) are vacuum-dried under a pressure between 0.0001 bar and 10.0 bar or with IR lamp.

11. The method for preparing laminar zinc hydroxide organic-inorganic nanocomposites according to claim 1, wherein the products obtained from step (j) are dried with an IR lamp.

* * * * *